United States Patent
Kawashima (10) Patent No.: US 8,512,900 B2
(45) Date of Patent: Aug. 20, 2013

(54) NONAQUEOUS ELECTROLYTIC SOLUTION SECONDARY BATTERY

(75) Inventor: Atsumichi Kawashima, Fukushima (JP)

(73) Assignee: Sony Corporation, Tokyo (JP)

( * ) Notice: Subject to any disclaimer, the term of this patent is extended or adjusted under 35 U.S.C. 154(b) by 710 days.

(21) Appl. No.: 12/704,241

(22) Filed: Feb. 11, 2010

(65) Prior Publication Data
US 2010/0209785 A1 Aug. 19, 2010

(30) Foreign Application Priority Data
Feb. 19, 2009 (JP) .............................. P2009-036946

(51) Int. Cl.
*H01M 6/16* (2006.01)

(52) U.S. Cl.
USPC ........... 429/330; 429/331; 429/338; 429/329; 429/340; 429/307; 252/62.2

(58) Field of Classification Search
USPC ............... 429/330, 331, 338, 329, 340, 307; 252/62.2
See application file for complete search history.

(56) References Cited

U.S. PATENT DOCUMENTS

| | | | |
|---|---|---|---|
| 6,368,744 | B1 | 4/2002 | Hatazawa et al. |
| 6,509,123 | B1 | 1/2003 | Shibuya et al. |
| 2005/0008941 | A1 | 1/2005 | Kim et al. |
| 2008/0096112 | A1 | 4/2008 | Ihara et al. |
| 2008/0286648 | A1 | 11/2008 | Ihara et al. |

FOREIGN PATENT DOCUMENTS

| | | |
|---|---|---|
| JP | 2000-58014 | 2/2000 |
| JP | 2000-156208 | 6/2000 |
| JP | 2001-167797 | 6/2001 |
| JP | 2002-8718 | 1/2002 |
| JP | 2002-033017 | 1/2002 |
| JP | 2004-22336 | 1/2004 |
| JP | 2005-502179 | 1/2005 |
| JP | 2005-123091 | 5/2005 |
| JP | 2005-243490 | 9/2005 |
| JP | 2006-156021 | 6/2006 |
| JP | 2008-098053 | 4/2008 |
| JP | 2008-147117 | 6/2008 |
| JP | 2008-147119 | 6/2008 |
| JP | 2008-171809 | 7/2008 |
| JP | 2008-305573 | 12/2008 |

OTHER PUBLICATIONS

Japanese Office Action issued on Jun. 21, 2011 for corresponding Application No. 2009-036946.

*Primary Examiner* — Laura Weiner
(74) *Attorney, Agent, or Firm* — K&L Gates LLP (57) ABSTRACT

A nonaqueous electrolytic solution secondary battery includes a positive electrode, a negative electrode, and a nonaqueous electrolytic solution having an electrolyte salt dissolved in a nonaqueous solvent. The nonaqueous solvent contains 80% by mass or more of a cyclic carbonate which does not have a carbon-carbon multiple bond and which does not contain a halogen and contains a cyclic sulfone compound having any one of structures represented by the following formulae (1) to (4):

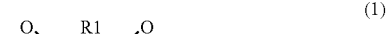

(1)

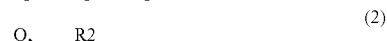

(2)

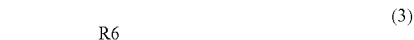

(3)

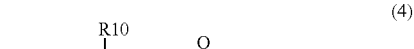

(4)

wherein each of R1 and R2 represents $C_mH_{2m}$ where $1 \leq m \leq 4$. Also, each of R3 to R10 independently represents $C_nH_{2n+1}$ where $1 \leq n \leq 4$.

15 Claims, 2 Drawing Sheets

NONAQUEOUS ELECTROLYTIC SOLUTION SECONDARY BATTERY

CROSS REFERENCES TO RELATED APPLICATIONS

The present application claims priority to Japanese Priority Patent Application JP 2009-036946 filed in the Japan Patent Office on Feb. 19, 2009, the entire content of which is hereby incorporated by reference.

BACKGROUND

The present disclosure relates to a nonaqueous electrolytic solution secondary battery capable of enhancing a discharge capacity retention rate at the time of repetition of charge and discharge.

In recent years, a number of portable electronic appliances such as a camera-integrated VTR, a digital still camera, a mobile phone, a personal digital assistant and a laptop computer, each achieving a reduction in size and weight, have appeared. With respect to batteries, in particular, secondary batteries as a portable power source for such electronic appliances, intensive studies have been conducted for the purpose of enhancing the energy density. Of secondary batteries, lithium ion secondary batteries using carbon for a negative electrode active material, a lithium-transition metal complex oxide for a positive electrode active material and a nonaqueous solvent such as a carbonate mixture for an electrolytic solution have been widely put to practical use because they are able to obtain a high energy density as compared with lead batteries and nickel-cadmium batteries which are a nonaqueous electrolytic solution secondary battery of the related art.

In particular, laminate type batteries using an aluminum laminated film for an exterior are lightweight, and therefore, the energy density is high. In the laminate type batteries, it is carried out to incorporate a polymer as an electrolyte together with an electrolytic solution. In such a laminate type polymer battery, when the electrolytic solution is swollen in the polymer, deformation of the laminate type battery can be suppressed, and in particular, gel electrolyte batteries using a gel polymer obtained by swelling an electrolytic solution in a polymer to gel it are widely used.

However, since the laminate type battery is easy to cause blister in a high-temperature atmosphere because its exterior is soft, it is carried out to incorporate 80% by mass or more of a cyclic carbonate having a high boiling point in an electrolytic solution (see, for example, JP-A-2001-167797).

However, the cyclic carbonate has a high viscosity, and hence, there was involved such a problem that a discharge capacity retention rate at the time of repetition of charge and discharge is reduced.

Thus, it is desirable to provide a nonaqueous electrolytic solution secondary battery which, even when a cyclic carbonate is incorporated in a high concentration in a nonaqueous electrolytic solution, is able to enhance a discharge capacity retention rate at the time of repetition of charge and discharge.

SUMMARY

The foregoing problem can be solved by incorporating a cyclic sulfone compound having a specified structure in a nonaqueous electrolytic solution.

According to embodiments, there are provided the following nonaqueous electrolytic solution secondary battery and nonaqueous electrolytic solution.

[1] A nonaqueous electrolytic solution secondary battery including a positive electrode, a negative electrode and a nonaqueous electrolytic solution having an electrolyte salt dissolved in a nonaqueous solvent, wherein the nonaqueous solvent contains 80% by mass or more of a cyclic carbonate which does not have a carbon-carbon multiple bond and which does not contain a halogen and contains a cyclic sulfone compound having any one of structures represented by the following formulae (1) to (4).

(1)

(2)

(3)

(4)

In the formulae (1) to (4), each of R1 and R2 represents $C_mH_{2m}$ ($1 \leq m \leq 4$); and each of R3 to R10 independently represents $C_nH_{2n+1}$ ($1 \leq n \leq 4$).

[2] A nonaqueous electrolytic solution including an electrolyte salt dissolved in a nonaqueous solvent, wherein the nonaqueous solvent contains 80% by mass or more of a cyclic carbonate which does not have a carbon-carbon multiple bond and which does not contain a halogen and contains a cyclic sulfone compound having any one of structures represented by the following formulae (1) to (4).

(1)

(2)

(3)

(4)

In the formulae (1) to (4), each of R1 and R2 represents $C_mH_{2m}$ ($1 \leq m \leq 4$); and each of R3 to R10 independently represents $C_nH_{2n+1}$ ($1 \leq n \leq 4$).

In accordance with the nonaqueous electrolytic solution secondary battery according to the embodiment, not only blister at the time of high-temperature storage can be suppressed, but a discharge capacity retention rate at the time of repetition of charge and discharge can be enhanced.

Additional features and advantages are described herein, and will be apparent from the following Detailed Description and the figures.

DETAILED DESCRIPTION

Embodiments are hereunder described with reference to the accompanying drawings.

Figure 1:
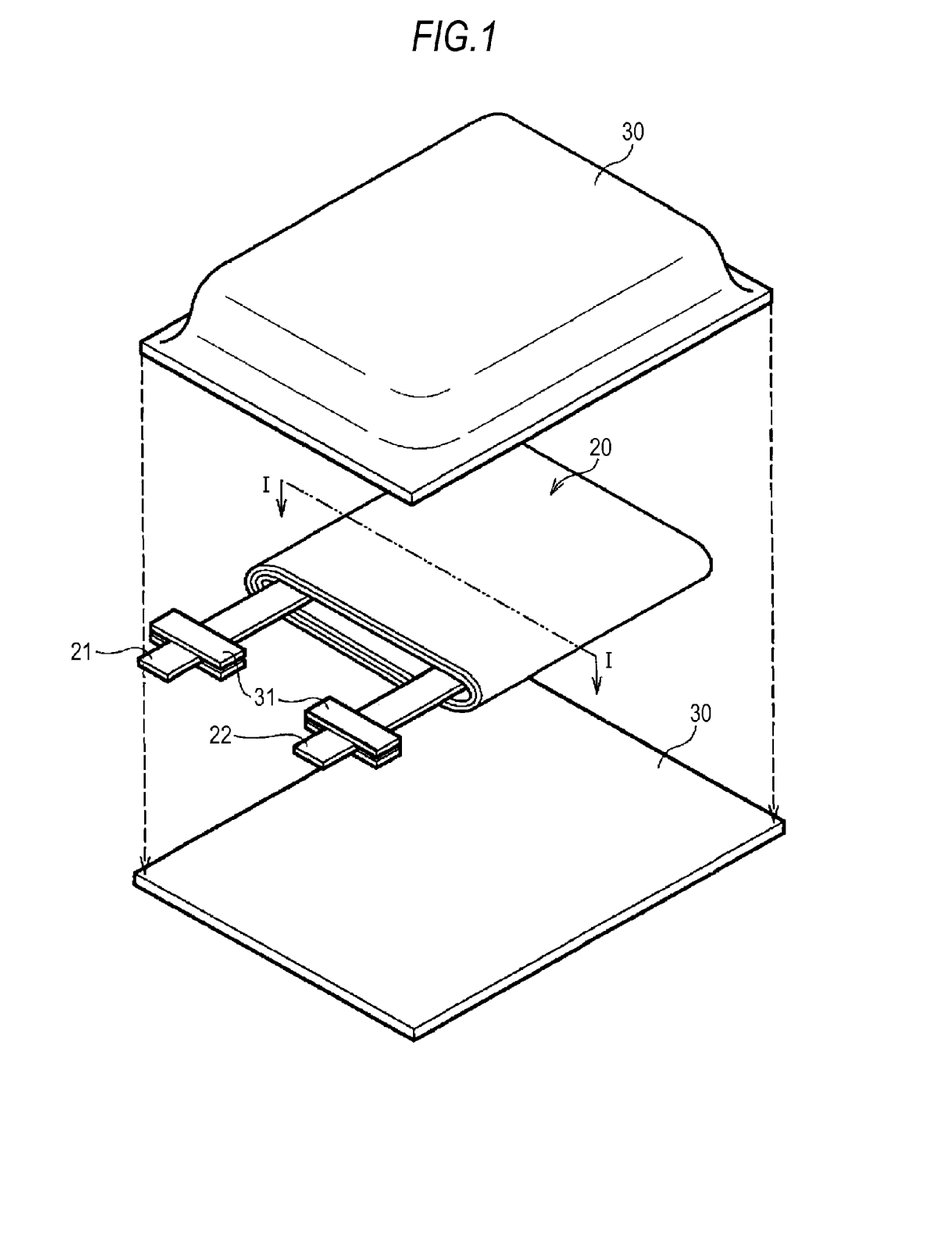
FIG. 1 is an exploded perspective view showing a configuration of a nonaqueous electrolytic solution secondary battery according to an embodiment of the present invention.

FIG. 1 schematically shows a configuration of a secondary battery according to an embodiment. This secondary battery is of a so-called laminated film type and is one in which a wound electrode body 20 having a positive electrode lead 21 and a negative electrode lead 22 installed therein is housed in the inside of an exterior member 30 in a film form.

The positive electrode lead 21 and the negative electrode lead 22 are each led out in, for example, the same direction from the inside toward the outside of the exterior member 30. Each of the positive electrode lead 21 and the negative electrode lead 22 is made of a metal material, for example, aluminum, copper, nickel, stainless steel, etc. and formed in a thin plate state or network state.

Figure 2:
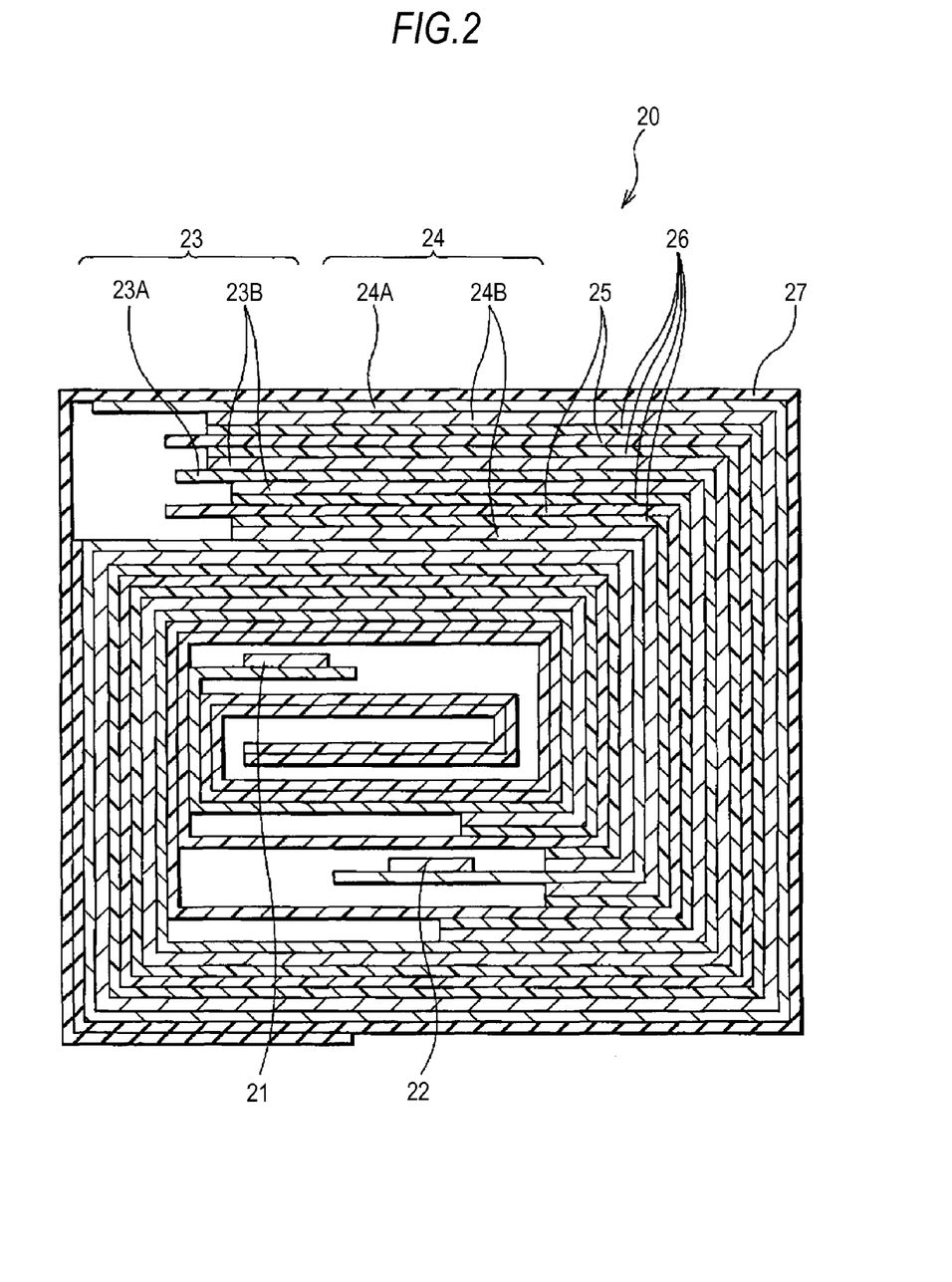
FIG. 2 is a sectional view showing a configuration of a wound electrode body shown in FIG. 1 along an I-I line thereof.

FIG. 2 shows a sectional structure along an I-I line of the wound electrode body 20 shown in FIG. 1. The wound electrode body 20 is one prepared by laminating a positive electrode 23 and a negative electrode 24 via a separator 25 and an electrolyte layer 26 and winding the laminate, and an outermost peripheral part thereof is protected by a protective tape 27.

(Positive Electrode)

The positive electrode 23 has a structure in which a positive electrode active material layer 23B is provided on the both surfaces of a positive electrode collector 23A. The positive electrode collector 23A is made of a metal material, for example, aluminum, nickel, stainless steel, etc. The positive electrode active material layer 23B contains, as a positive electrode active material, one or plural kinds of a positive electrode material capable of intercalating and deintercalating lithium, and it may also contain a conductive agent such as carbon materials and a binder such as polyvinylidene fluoride, if desired.

As the positive electrode material capable of intercalating and deintercalating lithium, for example, lithium complex oxides such as lithium cobaltate, lithium nickelate and solid solutions thereof ($Li(Ni_xCo_yMn_z)O_2$) (values of x, y and z are satisfied with the relationships of ($0<x<1$), ($0<y<1$), ($0 \leq z<1$) and ($x+y+z$)=1, respectively), and manganese spinel ($LiMn_2O_4$) and solid solutions thereof ($Li(Mn_{2-v}Ni_v)O_4$) (a value of v is satisfied with the relationship of $v<2$); and phosphate compounds having an olivine structure, such as lithium iron phosphate compound ($LiFePO_4$) are preferable. When such a positive electrode material is used, a high energy density is obtainable. Also, examples of the positive electrode material capable of intercalating and deintercalating lithium include oxides such as titanium oxide, vanadium oxide and manganese dioxide; disulfides such as iron disulfide, titanium disulfide and molybdenum sulfide; sulfur; and conductive polymers such as polyaniline and polythiophene.

In the nonaqueous electrolytic solution secondary battery according to the embodiment of the present invention, a thickness of the positive electrode active material layer 23B is preferably in the range of 40 µm or more and not more than 100 µm, and more preferably from 40 to 80 µm per one surface. When the thickness of the positive electrode active material layer 23B is 40 µm or more, it is possible to contrive to realize a high capacity of the battery. Also, when the thickness of the positive electrode active material layer 23B is not more than 100 µm, it is possible to increase the discharge capacity retention rate at the time of repetition of charge and discharge. Also, it is preferable to coat and dry the positive electrode active material layer 23B so as to have a coverage of from 14 to 30 mg/cm² per one surface.

(Negative Electrode)

For example, the negative electrode 24 has a structure in which a negative electrode active material layer 24B is provided on the both surfaces of a negative electrode collector 24A having a pair of surfaces opposing to each other, and the negative electrode active material layer 24B and the positive electrode active material layer 23B are disposed opposing to each other. The negative electrode collector 24A is made of a metal material, for example, copper, nickel, stainless steel, etc.

The negative electrode active material layer 24B contains, as a negative electrode active material, one or plural kinds of a negative electrode material capable of intercalating and deintercalating lithium. In this secondary battery, the charge capacity of the negative electrode material capable of intercalating and deintercalating lithium is larger than that of the positive electrode 23, and the battery is regulated such that a lithium metal does not deposit on the negative electrode 24 on the way of charge.

Examples of the negative electrode material capable of intercalating and deintercalating lithium include carbon materials, for example, hardly graphitized carbon, easily graphitized carbon, graphite, pyrolytic carbons, cokes, vitreous carbons, organic polymer compound baked materials, carbon fibers, active carbon, etc. Of these, examples of the cokes include pitch coke, needle coke and petroleum coke. The organic polymer compound baked material as referred to herein is a material obtained through carbonization by baking a polymer material such as phenol resins and furan resins at an appropriate temperature, and a part thereof is classified into hardly graphitized carbon or easily graphitized carbon. Also, examples of the polymer material include polyacetylene and polypyrrole. Such a carbon material is preferable because a change in the crystal structure to be generated at the time of charge and discharge is very small, a high charge and discharge capacity is obtainable, and favorable cycle characteristics are obtainable. In particular, graphite is preferable because its electrochemical equivalent is large, and a high energy density is obtainable. Also, hardly graphitized carbon is preferable because excellent characteristics are obtainable. Moreover, a material having a low charge and discharge potential, specifically one having a charge and discharge potential close to a lithium metal, is preferable because it is easy to realize a high energy density of the battery.

Also, in addition to the foregoing carbon materials, a material containing an element capable of forming an alloy with lithium, such as silicon and tin and compounds thereof, magnesium, aluminum and germanium may be used as the negative electrode material. Furthermore, a material containing an element capable of forming a complex oxide with lithium, such as titanium, may be thought.

In the nonaqueous electrolytic solution secondary battery according to the embodiment of the present invention, a thickness of the negative electrode active material layer 24B is preferably in the range of 40 μm or more and not more than 100 μm, and more preferably from 40 to 80 μm per one surface. When the thickness of the negative electrode active material layer 24B is 40 μm or more, it is possible to contrive to realize a high capacity of the battery. Also, when the thickness of the negative electrode active material layer 24B is not more than 100 μm, it is possible to increase the discharge capacity retention rate at the time of repetition of charge and discharge. Also, it is preferable to coat and dry the negative electrode active material layer 24B so as to have a coverage of from 7 to 15 mg/cm$^2$ per one surface.

(Separator)

The separator 25 partitions the positive electrode 23 and the negative electrode 24 from each other and allows a lithium ion to pass therethrough while preventing a short circuit of the current to be caused due to the contact of the both electrodes. This separator 25 is made of, for example, a porous film made of a synthetic resin such as polytetrafluoroethylene, polypropylene and polyethylene; or a porous film made of a ceramic. The separator 25 may also have a structure in which plural kinds of these porous films are laminated.

(Nonaqueous Electrolytic Solution)

In the nonaqueous electrolytic solution secondary battery according to the embodiment, the nonaqueous electrolytic solution (hereinafter also referred to simply as "electrolytic solution") includes a nonaqueous solvent and an electrolyte salt.

(Nonaqueous Solvent)

The nonaqueous solvent (hereinafter also referred to simply as "solvent") uses a high-dielectric constant solvent having a relative dielectric constant of 30 or more as a prime solvent. This is because according to this, the number of lithium ions can be increased. In the embodiment according to the present invention, the nonaqueous solvent contains a cyclic carbonate which does not have a carbon-carbon multiple bond and which does not contain a halogen and contains a cyclic sulfone compound having a specified structure.

Examples of the cyclic carbonate which does not have a carbon-carbon multiple bond and which does not contain a halogen include ethylene carbonate, propylene carbonate, butylene carbonate and trimethylene carbonate, etc. Of these, it is preferable to use ethylene carbonate or propylene carbonate from the viewpoints of stability and viscosity. The cyclic carbonate which does not have a carbon-carbon multiple bond and which does not contain a halogen may be used singly or in admixture of plural kinds thereof.

A content of the cyclic carbonate which does not have a carbon-carbon multiple bond and which does not contain a halogen in the nonaqueous solvent is preferably 80% by mass or more, and more preferably 90% by mass or more. When the content of the cyclic carbonate which does not have a carbon-carbon multiple bond and which does not contain a halogen falls within the foregoing range, blister of the battery can be suppressed, and favorable cycle characteristics are obtainable. A content of the cyclic carbonate which does not have a carbon-carbon multiple bond and which does not contain a halogen in the nonaqueous electrolytic solution is preferably 70% by mass or more, and more preferably from 80 to 90% by mass.

The nonaqueous solvent contains a cyclic sulfone compound having any one of structures represented by the following formulae (1) to (4) together with the cyclic carbonate which does not have a carbon-carbon multiple bond and which does not contain a halogen. By incorporating the cyclic sulfone compound in the nonaqueous solvent, even when the nonaqueous solvent contains 80% by mass or more of the cyclic carbonate which does not have a carbon-carbon multiple bond and which does not contain a halogen, a reduction of the discharge capacity retention rate at the time of repetition of charge and discharge can be prevented from occurring. It may be thought that the cyclic sulfone compound forms a film on the electrode surface, thereby suppressing decomposition of the solvent of the electrolytic solution.

(1)

(2)

(3)

(4)

In the formulae (1) and (2), each of R1 and R2 represents $C_mH_{2m}$ ($1 \leq m \leq 4$). Examples of such a cyclic sulfone compound include 1,2-ethanedisulfonic anhydride in which R1 has two carbon atoms (formula (1-1)); 1,3-propanedisulfonic anhydride in which R1 has three carbon atoms (formula (1-2)); 2-sulfopropionic anhydride in which R2 has two carbon atoms (formula (2-1)); and 3-sulfobutyric anhydride in which R2 has three carbon atoms (formula (2-2)).

(1-1)

-continued (1-2)

(2-1)

(2-2)

In the formulae (3) and (4), each of R3 to R10 independently represents $C_nH_{2n+1}$ ($1 \leq n \leq 4$). Examples of such a cyclic sulfone compound include 1,2-benzenedisulfonic acid in which each of R3, R4, R5 and R6 has one carbon atom (formula (3-1)); and sulfobenzoic anhydride in which each of R7, R8, R9 and R10 has one carbon atom (formula (4-1)).

(3-1)

(4-1)

The cyclic sulfone compound may be used singly or in admixture of plural kinds thereof. Of these sulfone compounds, it is preferable to use 1,3-propanedisulfonic anhydride from the viewpoint of cycle characteristics.

A content of the cyclic sulfone compound in the nonaqueous solvent is preferably in the range of 0.1% by mass or more and not more than 2.0% by mass, and more preferably from 0.2 to 1.5% by mass. This is because when the content of the cyclic sulfone compound falls within the foregoing range, favorable cycle characteristics are obtainable.

The electrolytic solution (electrolytic solution composition) according to the embodiment may further contain other high-dielectric constant solvent. Examples of other high-dielectric constant solvent include cyclic carbonates having a carbon-carbon multiple bond, such as vinylene carbonate and vinyl ethylene carbonate; halogenated cyclic carbonates such as chloroethylene carbonate, 4-fluoro-1,3-dioxolan-2-one (fluoroethylene carbonate), trans-4,5-difluoro-fluoro-1,3-dioxolan-2-one (difluoroethylene carbonate) and trifluoromethyl ethylene carbonate; lactones such as γ-butyrolactone and γ-valerolactone; lactams such as N-methyl-2-pyrrolidone; cyclic carbamates such as N-methyl-2-oxazolidinone; and sulfone compounds such as tetramethylene sulfone. Of these, it is preferable to use a cyclic carbonate having a carbon-carbon multiple bond, especially vinylene carbonate, vinyl ethylene carbonate or the like. A content of the cyclic carbonate having a carbon-carbon multiple bond in the electrolytic solution is preferably in the range of from 0.5 to 5% by mass. Also, it is preferable to use a halogenated cyclic carbonate, especially fluoroethylene carbonate, difluoroethylene carbonate or the like. A content of the halogenated cyclic carbonate in the electrolytic solution is preferably in the range of from 0.5 to 5% by mass. Also, it is preferable to use a lactone, especially γ-butyrolactone. A content of the lactone in the electrolytic solution is preferably in the range of from 0.5 to 5% by mass. The high-dielectric constant solvent may be used singly or in admixture of plural kinds thereof.

It is preferable to use a mixture of the high-dielectric constant solvent with a low-viscosity solvent having a viscosity of not more than 1 mPa·s in the electrolytic solution. This is because according to this, higher ionic conductivity is obtainable. A ratio (mass ratio) of the low-density solvent relative to the high-dielectric constant solvent is preferably in the range of from 85/15 to 100/0 in terms of a (high-dielectric constant solvent)/(low-viscosity solvent) ratio. This is because when the ratio of the low-viscosity solvent falls within this range, higher effects are obtainable.

Examples of the low-viscosity solvent include chain carbonates such as dimethyl carbonate, ethyl methyl carbonate, diethyl carbonate and methyl propyl carbonate; chain carboxylates such as methyl acetate, ethyl acetate, methyl propionate, ethyl propionate, methyl butyrate, methyl isobutyrate, methyl trimethylacetate and ethyl trimethylacetate; chain amides such as N,N-dimethylacetamide; chain carbamates such as methyl N,N-diethylcarbamate and ethyl N,N-diethylcarbamate; and ethers such as 1,2-dimethoxyethane, tetrahydrofuran, tetrahydropyrane and 1,3-dioxolane. Such a low-viscosity solvent may be used singly or in admixture of plural kinds thereof.

(Electrolyte Salt)

As the electrolyte salt which is soluble in the foregoing nonaqueous solvent, any material is useful upon being mixed so far as it is useful for batteries of this type. Examples thereof include inorganic lithium salts such as lithium hexafluorophosphate ($LiPF_6$), lithium tetrafluoroborate ($LiBF_4$), lithium hexafluoroarsenate ($LiAsF_6$), lithium hexafluoroantimonate ($LiSbF_6$), lithium perchlorate ($LiClO_4$) and lithium tetrachloroaluminate ($LiAlCl_4$); and lithium salts of perfluoroalkanesulfonic acid derivatives such as lithium trifluoromethanesulfonate ($CF_3SO_3Li$), lithium bis(trifluoromethanesulfone)imide [$(CF_3SO_2)_2NLi$], lithium bis(pentafluoroethanesulfone)imide [$(C_2F_5SO_2)_2NLi$] and lithium tris(trifluoromethanesulfone)methide [$(CF_3SO_2)_3CLi$]. Of these electrolyte salts, it is preferable to use lithium hexafluorophosphate from the viewpoints of cost and stability. A content of the electrolyte salt in the electrolytic solution is preferably in the range of from 5 to 14% by mass. The electrolyte salt may be used singly or in admixture of plural kinds thereof.

(Polymer Compound)

It is preferable that the battery according to the embodiment contains a polymer compound which is swollen by the electrolytic solution to serve as a holding body for holding the electrolytic solution. According to this, the electrolytic solution is held by the polymer compound, and the electrolytic solution and the polymer compound are integrated to form an electrolyte in a gel form. When the battery contains the polymer compound which is swollen by the electrolytic solution, a high ionic conductivity is obtainable, excellent charge and discharge efficiency is obtainable, and leakage of the battery can be prevented from occurring.

In the case wherein the polymer compound is used upon being added to the electrolytic solution, a content of the polymer compound is preferably in the range of 0.1% by mass or more and not more than 10% by mass relative to the total sum of the electrolytic solution and the polymer compound. This is because when the content of the polymer compound falls within the foregoing range, higher charge and discharge efficiency is obtainable. Also, in the case where the polymer compound is used upon being coated on the both surfaces of the separator, a mass ratio of the electrolytic solution and the polymer compound is preferably in the range of from 50/1 to 10/1. This is because when the mass ratio of the electrolytic solution and the polymer compound falls within this range, higher charge and discharge efficiency is obtainable.

Polyvinylidene fluoride having a structure represented by the following formula (8) or a copolymer thereof is preferably used as the polymer compound. The copolymer of polyvinylidene fluoride is a copolymer of vinylidene fluoride and other monomer, and examples thereof include a copolymer of vinylidene fluoride and hexafluoropropylene and a copolymer of vinylidene fluoride and chlorotrifluoroethylene.

(8)

In the formula (8), u represents an integer of from 100 to 10,000.

In addition to the foregoing polyvinylidene fluoride or its copolymer, examples of the polymer compound include ether based polymer compounds such as polyvinyl formal represented by the following formula (9), polyethylene oxide and a crosslinked material including polyethylene oxide; ester based polymer compounds such as polyacrylates represented by the following formula (10); and acrylate based polymer compounds. The polymer compound may be used singly or in admixture of plural kinds thereof.

In the formulae (9) and (10), each of s and t represents an integer of from 100 to 10,000; and R represents $C_xH_{2x+1}O_y$, ($1 \leq x \leq 8$ and $0 \leq y \leq 4$).

(Exterior Member)

The exterior member 30 is made of, for example, a rectangular aluminum laminated film obtained by sticking a nylon film, an aluminum foil and a polyethylene film in this order. The exterior member 30 is, for example, provided in such a manner that the polyethylene film side and the wound electrode body 20 are disposed opposing to each other, and respective outer edges thereof are brought into intimate contact with each other by means of fusion or with an adhesive. A contact film 31 is inserted between the exterior member 30 and each of the positive electrode lead 21 and the negative electrode lead 22 for the purpose of preventing invasion of the outside air. This contact film 31 is made of a material having adhesion to each of the positive electrode lead 21 and the negative electrode lead 22. Examples of such a material include polyolefin resins such as polyethylene, polypropylene, modified polyethylene and modified polypropylene.

The exterior member 30 may be made of a laminated film having other structure, or a polymer film such as polypropylene or a metal film in place of the foregoing aluminum laminated film.

(Manufacturing Method)

This secondary battery can be, for example, manufactured in the following manner.

The positive electrode can be, for example, manufactured in the following manner. First of all, a positive electrode active material, a conductive agent and a binder are mixed to prepare a positive electrode mixture, and this positive electrode mixture is dispersed in a solvent such as N-methyl-2-pyrrolidone to form a positive electrode mixture slurry in a paste form. Subsequently, this positive electrode mixture slurry is coated on the positive electrode collector 23A, and after drying the solvent, the resultant is subjected to compression molding by a roll press or the like, thereby forming the positive electrode active material layer 23B. There is thus prepared the positive electrode 23. On that occasion, the positive electrode active material layer 23B is regulated so as to have a thickness of 40 μm or more.

Also, the negative electrode can be, for example, manufactured in the following manner. First of all, a negative electrode active material containing at least one of silicon and tin as a constituent element, a conductive agent and a binder are mixed to prepare a negative electrode mixture, and this negative electrode mixture is dispersed in a solvent such as N-methyl-2-pyrrolidone to form a negative electrode mixture slurry in a paste form. Subsequently, this negative electrode mixture slurry is coated on the negative electrode collector 24A and dried, and the resultant is subjected to compression molding, thereby forming the negative electrode active material layer 24B containing a negative electrode active material particle made of the foregoing negative electrode active material. There is thus obtained the negative electrode 24. On that occasion, the negative electrode active material layer 24B is regulated so as to have a thickness of 40 μm or more.

Subsequently, a precursor solution containing a nonaqueous electrolytic solution, a polymer compound and a mixed solvent is coated on each of the positive electrode 23 and the negative electrode 24, and the mixed solvent is vaporized to form the electrolyte layer 26. Subsequently, the positive electrode lead 21 is installed in the positive electrode collector 23A, and the negative electrode lead 22 is also installed in the negative electrode collector 24A. Subsequently, the positive electrode 23 and the negative electrode 24 each having the electrolyte layer 26 formed thereon are laminated via the separator 25 to form a laminate, this laminate is then wound in a longitudinal direction thereof, and the protective tape 27 is allowed to adhere to the outermost peripheral part to form the wound electrode body 20. Thereafter, for example, the wound electrode body 20 is interposed between the exterior members 30, and the outer edges of the exterior members 30 are brought into intimate contact with each other by means of heat fusion, etc., thereby sealing the wound electrode body 20. On that occasion, the contact film 31 is inserted between each of the positive electrode lead 21 and the negative electrode lead 22 and the exterior member 30. According to this, the secondary battery shown in FIGS. 1 and 2 is completed.

This secondary battery may also be prepared in the following manner. In a manner similar to that as described above, the positive electrode 23 and the negative electrode 24 are first prepared; the positive electrode lead 21 and the negative electrode lead 22 are installed in the positive electrode 23 and the negative electrode 24, respectively; the positive electrode 23 and the negative electrode 24 are then laminated via the separator 25 and wound; and the protective tape 27 is allowed to adhere to the outermost peripheral part, thereby forming a wound body serving as a precursor of the wound electrode body 20. Subsequently, this wound body is interposed between the exterior members 30, and the outer edges exclusive of one side are heat fused to form the wound body in a bag form, thereby housing it the inside of the exterior member 30. Subsequently, a composition for electrolyte containing an electrolytic solution and a monomer as a raw material of the polymer compound and optionally other material such as a polymerization initiator or a polymerization inhibitor is prepared and injected into the inside of the exterior member 30. Thereafter, an opening of the exterior member 30 is hermetically sealed by means of heat fusion. Thereafter, the monomer is polymerized upon being optionally heated to form a polymer compound, thereby forming the electrolyte layer 26 in a gel form. There is thus assembled the secondary battery shown in FIGS. 1 and 2.

In this secondary battery, when charged, for example, a lithium ion is deintercalated from the positive electrode 23 and intercalated in the negative electrode 24 via the electrolytic solution. On the contrary, when discharged, for example, a lithium ion is deintercalated from the negative electrode 24 and intercalated in the positive electrode 23 via the electrolytic solution.

While in the foregoing embodiments, the case of using an electrolyte in a gel form having a polymer compound held in an electrolytic solution as well as the case of using an electrolytic solution as an electrolyte have been described, other electrolytes may be used, too. Examples of other electrolytes include a mixture of an electrolytic solution with an ion conductive inorganic compound such as an ion conductive ceramic, an ion conductive glass and an ionic crystal; a mixture of an electrolytic solution with other inorganic compound; and a mixture of an electrolyte in a gel form with such an inorganic compound.

Furthermore, while in the foregoing embodiments, a battery using lithium as an electrode reactant has been described, the present invention is also applicable to the case of using other alkali metal (for example, sodium (Na), potassium (K), etc.), an alkaline earth metal (for example, magnesium, calcium (Ca), etc.) or other light metal (for example, aluminum, etc.).

Moreover, while in the foregoing embodiments, a so-called lithium ion secondary battery in which the capacity of a negative electrode is expressed by a capacity component due to the intercalation and deintercalation of lithium has been described, the present invention is similarly applicable to a so-called lithium metal secondary battery in which a lithium metal is used for a negative electrode active material, and the capacity of a negative electrode is expressed by a capacity component due to deposition and dissolution of lithium; or a secondary battery in which by making the charge capacity of a negative electrode material capable of intercalating and deintercalating lithium smaller than the charge capacity of a positive electrode, the capacity of a negative electrode includes a capacity component due to intercalation and deintercalation of lithium and a capacity component due to deposition and dissolution of lithium and is expressed by the total sum thereof.

EXAMPLES

Examples 1 to 16 and Comparative Examples 1 to 5

Example 1

First of all, 94 parts by mass of a lithium cobalt complex oxide ($LiCoO_2$) as a positive electrode active material, 3 parts by mass of graphite as a conductive agent and 3 parts by mass of polyvinylidene fluoride (PVdF) as a binder were homogeneously mixed, to which was then added N-methylpyrrolidone, thereby obtaining a positive electrode mixture coating solution. Subsequently, the obtained positive electrode mixture coating solution was uniformly coated on the both surfaces of a 20 μm-thick aluminum foil and then dried to form a positive electrode mixture layer of 16 mg/cm$^2$ per one surface. This was cut into a shape having a width of 50 mm and a length of 300 nm, thereby preparing a positive electrode.

Subsequently, 97 parts by mass of graphite as a negative electrode active material and 3 parts by mass of PVdF as a binder were homogeneously mixed, to which was then added N-methylpyrrolidone, thereby obtaining a negative electrode mixture coating solution. Subsequently, the obtained negative electrode mixture coating solution was uniformly coated on the both surfaces of a 15 μm-thick copper foil serving as a negative electrode collector and then dried to form a negative electrode mixture layer of 8 mg/cm$^2$ per one surface. This was cut into a shape having a width of 50 mm and a length of 300 mm, thereby preparing a negative electrode.

An electrolytic solution was prepared by dissolving 0.6 mole/kg (8.4% by mass) of lithium hexafluorophosphate in a prime solvent composed of a mixture of ethylene carbonate and propylene carbonate in a ratio of 1/1 (by mass) (45.0/45.0% by mass) and further mixing with 1.0% by mass of vinylene carbonate and 0.6% by mass of 1,3-propanedisulfonic anhydride. In Example 1, a content of ethylene carbonate and propylene carbonate, each of which is the cyclic carbonate which does not have a carbon-carbon multiple bond and which does not contain a halogen, in the solvent is 98.3% by mass.

The foregoing positive electrode and negative electrode were laminated via a separator made of a 9 μm-thick microporous polyethylene film and wound, and the laminate was put in a bag made of an aluminum laminated film. 2 g of the foregoing electrolytic solution was injected into this bag, and the bag was then heat fused to prepare a laminate type battery. A capacity of this battery was 800 mAh.

Blister (%) of the battery thickness when this battery was charged with 800 mA in an atmosphere at 23° C. for 3 hours while regulating an upper limit at 4.2 V and then stored at 90° C. for 4 hours is shown in Table 1. A charge capacity retention rate (%) obtained after charging with 800 mA in an atmosphere at 23° C. for 3 hours while regulating an upper limit at 4.2 and then repeating constant-current discharge with 800 mA while regulating a lower limit at 3 V by 300 cycles is also shown in Table 1.

Examples 2 and 3

Laminate type batteries were prepared in the same manner as in Example 1, except that in the electrolytic solution, the ratio of 1,3-propanedisulfonic anhydride was changed as shown in Table 1 and that the amount of each of ethylene carbonate and propylene carbonate was increased or decreased in proportion thereto. The content of ethylene carbonate and propylene carbonate, each of which is the cyclic carbonate which does not have a carbon-carbon multiple bond and which does not contain a halogen, in the solvent is 98.8% by mass in Example 2 and 96.7% by mass in Example 3, respectively. Blister (%) of the battery thickness at the time of storing each of the batteries at 90° C. for 4 hours and a charge capacity retention rate (%) obtained after 300 cycles are shown in Table 1.

Examples 4 and 5

Laminate type batteries were prepared in the same manner as in Example 1, except that in the electrolytic solution, the ratio of ethylene carbonate and propylene carbonate was changed as shown in Table 1. Blister (%) of the battery thickness at the time of storing each of the batteries at 90° C. for 4 hours and a charge capacity retention rate (%) obtained after 300 cycles are shown in Table 1.

Examples 6 to 10

Laminate type batteries were prepared in the same manner as in Example 1, except that in the electrolytic solution, a cyclic sulfone compound as shown in Table 1 was used in place of the 1,3-propanedisulfonic anhydride. Blister (%) of the battery thickness at the time of storing each of the batteries at 90° C. for 4 hours and a charge capacity retention rate (%) obtained after 300 cycles are shown in Table 1.

Examples 11 to 13

Laminate type batteries were prepared in the same manner as in Example 1, except that in the electrolytic solution, a compound as shown in Table 1 was used in place of the vinylene carbonate. Blister (%) of the battery thickness at the time of storing each of the batteries at 90° C. for 4 hours and a charge capacity retention rate (%) obtained after 300 cycles are shown in Table 1.

Example 14

A laminate type battery was prepared in the same manner as in Example 1, except that in the electrolytic solution, 2.0% by mass of γ-butyrolactone was added as the prime solvent and that the amount of each of ethylene carbonate and propylene carbonate was decreased in proportion thereto. In Example 14, the content of ethylene carbonate and propylene carbonate in the solvent is 96.1% by mass. Blister (%) of the battery thickness at the time of storing this battery at 90° C. for 4 hours and a charge capacity retention rate (%) obtained after 300 cycles are shown in Table 1.

Example 15

A laminate type battery was prepared in the same manner as in Example 1, except that in the electrolytic solution, 4.0% by mass of ethyl methyl carbonate was added as the prime solvent and that the amount of each of ethylene carbonate and propylene carbonate was decreased in proportion thereto. In Example 15, the content of ethylene carbonate and propylene carbonate in the solvent is 90.6% by mass. Blister (%) of the battery thickness at the time of storing this battery at 90° C. for 4 hours and a charge capacity retention rate (%) obtained after 300 cycles are shown in Table 1.

Example 16

A laminate type battery was prepared in the same manner as in Example 1, except that in the electrolytic solution, 16% by mass of ethyl methyl carbonate was added as the prime solvent and that the amount of each of ethylene carbonate and propylene carbonate was decreased in proportion thereto. In Example 16, the content of ethylene carbonate and propylene carbonate in the solvent is 80.8% by mass. Blister (%) of the battery thickness at the time of storing this battery at 90° C. for 4 hours and a charge capacity retention rate (%) obtained after 300 cycles are shown in Table 1.

Comparative Example 1

A laminate type battery was prepared in the same manner as in Example 1, except that the cyclic sulfone compound was not mixed. Blister (%) of the battery thickness when this battery was charged with 800 mA in an atmosphere at 23° C. for 3 hours while regulating an upper limit at 4.2 V and then stored at 90° C. for 4 hours is shown in Table 1. A charge capacity retention rate (%) obtained after charging with 800 mA in an atmosphere at 23° C. for 3 hours while regulating an upper limit at 4.2 V and then repeating constant-current discharge with 800 mA while regulating a lower limit at 3 V by 300 cycles is also shown in Table 1.

Comparative Example 2

A laminate type battery was prepared in the same manner as in Example 1, except that the vinylene carbonate was not mixed. Blister (%) of the battery thickness at the time of storing this battery at 90° C. for 4 hours and a charge capacity retention rate (%) obtained after 300 cycles are shown in Table 1.

Comparative Example 3

A laminate type battery was prepared in the same manner as in Example 1, except that in the electrolytic solution, 30% by mass of ethyl methyl carbonate was added as the prime solvent and that the amount of each of ethylene carbonate and propylene carbonate was decreased in proportion thereto. In Comparative Example 3, the content of ethylene carbonate and propylene carbonate in the solvent is 65.5% by mass. Blister (%) of the battery thickness at the time of storing this battery at 90° C. for 4 hours and a charge capacity retention rate (%) obtained after 300 cycles are shown in Table 1.

Comparative Example 4

A laminate type battery was prepared in the same manner as in Example 1, except that in the electrolytic solution, methanesulfonic anhydride which is a chain sulfone compound was mixed in place of the 1,3-propanedisulfonic anhydride which is a cyclic sulfone compound. Blister (%) of the battery thickness at the time of storing this battery at 90° C. for 4 hours and a charge capacity retention rate (%) obtained after 300 cycles are shown in Table 1.

Comparative Example 5

A laminate type battery was prepared in the same manner as in Example 1, except that in the electrolytic solution, succinic anhydride which is a cyclic carboxylic acid anhydride was mixed in place of the 1,3-propanedisulfonic anhydride which is a cyclic sulfone compound. Blister (%) of the battery thickness at the time of storing this battery at 90° C. for 4 hours and a charge capacity retention rate (%) obtained after 300 cycles are shown in Table 1.

TABLE 1

| | Polymer compound: Not used | | | | | | | | | |
|---|---|---|---|---|---|---|---|---|---|---|
| | Prime solvent | | | | Other solvent | | Sulfone compound | | Blister of battery | Discharge capacity retention |
| | EC (% by mass) | PC (% by mass) | EMC (% by mass) | GBL (% by mass) | Kind | (% by mass) | Kind | (% by mass) | thickness (%) | rate after 300 cycles (%) |
| Example 1 | 45 | 45 | 0 | 0 | VC | 1 | PSAH | 0.6 | 5.2 | 84.8 |
| Example 2 | 45.25 | 45.25 | 0 | 0 | VC | 1 | PSAH | 0.1 | 5.4 | 81.3 |
| Example 3 | 44.3 | 44.3 | 0 | 0 | VC | 1 | PSAH | 2 | 5.1 | 81.5 |
| Example 4 | 36 | 54 | 0 | 0 | VC | 1 | PSAH | 0.6 | 4.2 | 82.3 |
| Example 5 | 54 | 36 | 0 | 0 | VC | 1 | PSAH | 0.6 | 6.2 | 84.9 |
| Example 6 | 45 | 45 | 0 | 0 | VC | 1 | ESAH | 0.6 | 5.1 | 82.5 |
| Example 7 | 45 | 45 | 0 | 0 | VC | 1 | SPAH | 0.6 | 5.1 | 83.5 |
| Example 8 | 45 | 45 | 0 | 0 | VC | 1 | SBuAH | 0.6 | 5.2 | 83.8 |
| Example 9 | 45 | 45 | 0 | 0 | VC | 1 | BSAH | 0.6 | 5.3 | 82 |
| Example 10 | 45 | 45 | 0 | 0 | VC | 1 | SBAH | 0.6 | 5.2 | 82.3 |
| Example 11 | 45 | 45 | 0 | 0 | VEC | 1 | PSAH | 0.6 | 5.4 | 84.5 |
| Example 12 | 45 | 45 | 0 | 0 | FEC | 1 | PSAH | 0.6 | 5.3 | 85 |
| Example 13 | 45 | 45 | 0 | 0 | DFEC | 1 | PSAH | 0.6 | 5.4 | 84.9 |
| Example 14 | 44 | 44 | 0 | 2 | VC | 1 | PSAH | 0.6 | 3.6 | 81.8 |
| Example 15 | 43 | 43 | 4 | 0 | VC | 1 | PSAH | 0.6 | 6.7 | 84.9 |
| Example 16 | 37 | 37 | 16 | 0 | VC | 1 | PSAH | 0.6 | 9.8 | 84.7 |
| Comparative Example 1 | 45.3 | 45.3 | 0 | 0 | VC | 1 | — | — | 5.5 | 81.1 |
| Comparative Example 2 | 45.5 | 45.5 | 0 | 0 | — | — | PSAH | 0.6 | 12.3 | 80.8 |
| Comparative Example 3 | 30 | 30 | 30 | 0 | VC | 1 | PSAH | 0.6 | 14.6 | 84.6 |
| Comparative Example 4 | 45 | 45 | 0 | 0 | VC | 1 | MSAH | 0.6 | 5.6 | 80.8 |
| Comparative Example 5 | 45 | 45 | 0 | 0 | VC | 1 | SCAH | 0.6 | 5.7 | 80.9 |

$LiPF_6$: 8.4% by mass
EC: Ethylene carbonate
PC: Propylene carbonate
EMC: Ethyl methyl carbonate
GBL: γ-Butyrolactone
VC: Vinylene carbonate
VEC: Vinyl ethylene carbonate
FEC: Fluoroethylene carbonate
DFEC: Difluoroethylene carbonate
PSAH: 1,3-Propanedisulfonic anhydride
ESAH: 1,2-Ethanedisulfonic anhydride
SPAH: 2-Sulfopropionic anhydride
SBuAH: 3-Sulfobutyric anhydride
BSAH: Benzenedisulfonic anhydride
SBAH: Sulfobenzoic anhydride
MSAH: Methanesulfonic anhydride
SCAH: Succinic anhydride As shown in Table 1, it has been noted from the results of Examples 1 to 5 and Comparative Example 1 that by adding the cyclic sulfone compound, the blister of the battery thickness at the time of storing the battery at 90° C. for 4 hours was the same degree or reduced as compared with Comparative Example 1 in which the cyclic sulfone compound was not added; and that the discharge capacity retention rate at the time of repeating the constant-current discharge by 300 cycles was enhanced as compared with Comparative Example 1.

It has been noted from the results of Examples 6 to 10 and Comparative Examples 4 and 5 that by adding the cyclic sulfone compound, not only the blister of the battery thickness at the time of storing the battery at 90° C. for 4 hours was reduced, but the discharge capacity retention rate at the time of repeating the constant-current discharge by 300 cycles was enhanced as compared with Comparative Example 4 in which the chain sulfone compound was added and Comparative Example 5 in which the cyclic carboxylic acid anhydride was added.

It has been noted from the results of Example 1 and Examples 11 to 13 and Comparative Example 2 that by adding the cyclic carbonate having a carbon-carbon multiple bond or the halogenated cyclic carbonate together with the cyclic sulfone compound, the blister of the battery thickness at the time of storing the battery at 90° C. for 4 hours was reduced as compared with Comparative Example 2 in which these compounds were not added; and that the discharge capacity retention rate at the time of repeating the constant-current discharge by 300 cycles was enhanced as compared with Comparative Example 2.

It has been noted from the results of Example 14 that by adding γ-butyrolactone, the blister of the battery thickness as the time of storing the battery at 90° C. for 4 hours was more reduced.

It has been noted from the results of Examples 15 and 16 and Comparative Example 3 that by incorporating 80% by mass or more of the cyclic carbonate which does not have a carbon-carbon multiple bond and which does not contain a halogen in the nonaqueous solvent, not only the blister of the battery thickness at the time of storing the battery at 90° C. for 4 hours was reduced, but the discharge capacity retention rate at the time of repeating the constant-current discharge by 300 cycles was enhanced as compared with Comparative Example 3.

Examples 17 to 32 and Comparative Examples 6 to 10

Example 17

A laminate type battery was prepared in the same manner as in Example 1, except that a separator prepared by regulating its thickness at 7 μm and coating polyvinylidene fluoride in a thickness of 2 μm on the both surface thereof was used. Blister (%) of the battery thickness at the time of storing this battery at 90° C. for 4 hours and a charge capacity retention rate (%) obtained after 300 cycles are shown in Table 2.

Examples 18 and 19

Laminate type batteries were prepared in the same manner as in Example 17, except that in the electrolytic solution, the ratio of 1,3-propanedisulfonic anhydride was changed as shown in Table 2 and that the amount of each of ethylene carbonate and propylene carbonate was increased or decreased in proportion thereto. Blister (%) of the battery thickness at the time of storing each of the batteries at 90° C. for 4 hours and a charge capacity retention rate (%) obtained after 300 cycles are shown in Table 2.

Examples 20 and 21

Laminate type batteries were prepared in the same manner as in Example 17, except that in the electrolytic solution, the ratio of ethylene carbonate and propylene carbonate was changed as shown in Table 2. Blister (%) of the battery thickness at the time of storing each of the batteries at 90° C. for 4 hours and a charge capacity retention rate (%) obtained after 300 cycles are shown in Table 2.

Examples 22 to 26

Laminate type batteries were prepared in the same manner as in Example 17, except that in the electrolytic solution, a cyclic sulfone compound as shown in Table 2 was used in place of the 1,3-propanedisulfonic anhydride. Blister (%) of the battery thickness at the time of storing each of the batteries at 90° C. for 4 hours and a charge capacity retention rate (%) obtained after 300 cycles are shown in Table 2.

Examples 27 to 29

Laminate type batteries were prepared in the same manner as in Example 17, except that in the electrolytic solution, a compound as shown in Table 2 was used in place of the vinylene carbonate. Blister (%) of the battery thickness at the time of storing each of the batteries at 90° C. for 4 hours and a charge capacity retention rate (%) obtained after 300 cycles are shown in Table 2.

Example 30

A laminate type battery was prepared in the same manner as in Example 17, except that in the electrolytic solution, γ-butyrolactone was added as the prime solvent and that the amount of each of ethylene carbonate and propylene carbonate was decreased in proportion thereto. Blister (%) of the battery thickness at the time of storing this battery at 90° C. for 4 hours and a charge capacity retention rate (%) obtained after 300 cycles are shown in Table 2.

Examples 31 and 32

Laminate type batteries were prepared in the same manner as in Example 17, except that in the electrolytic solution, ethyl methyl carbonate was added as the prime solvent in a proportion as shown in Table 2 and that the amount of each of ethylene carbonate and propylene carbonate was decreased in proportion thereto. Blister (%) of the battery thickness at the time of storing each of the batteries at 90° C. for 4 hours and a charge capacity retention rate (%) obtained after 300 cycles are shown in Table 2.

Comparative Example 6

A laminate type battery was prepared in the same manner as in Example 17, except that the cyclic sulfone compound was not mixed. Blister (%) of the battery thickness at the time of storing this battery at 90° C. for 4 hours and a charge capacity retention rate (%) obtained after 300 cycles are shown in Table 2.

Comparative Example 7

A laminate type battery was prepared in the same manner as in Example 17, except that the vinylene carbonate was not mixed. Blister (%) of the battery thickness at the time of storing this battery at 90° C. for 4 hours and a charge capacity retention rate (%) obtained after 300 cycles are shown in Table 2.

Comparative Example 8

A laminate type battery was prepared in the same manner as in Example 17, except that in the electrolytic solution, 30% by mass of ethyl methyl carbonate was added as the prime solvent and that the amount of each of ethylene carbonate and propylene carbonate was decreased in proportion thereto. Blister (%) of the battery thickness at the time of storing this battery at 90° C. for 4 hours and a charge capacity retention rate (%) obtained after 300 cycles are shown in Table 2.

Comparative Example 9

A laminate type battery was prepared in the same manner as in Example 17, except that in the electrolytic solution, methanesulfonic anhydride which is a chain sulfone compound was mixed in place of the 1,3-propanedisulfonic anhydride which is a cyclic sulfone compound. Blister (%) of the battery thickness at the time of storing this battery at 90° C. for 4 hours and a charge capacity retention rate (%) obtained after 300 cycles are shown in Table 2.

Comparative Example 10

A laminate type battery was prepared in the same manner as in Example 17, except that in the electrolytic solution, succinic anhydride which is a cyclic carboxylic acid anhydride was mixed in place of the 1,3-propanedisulfonic anhydride which is a cyclic sulfone compound. Blister (%) of the battery thickness at the time of storing this battery at 90° C. for 4 hours and a charge capacity retention rate (%) obtained after 300 cycles are shown in Table 2.

TABLE 2

Polymer compound: Polyvinylidene fluoride

| | Prime solvent | | | | Other solvent | | Sulfone compound | | Blister of battery thickness (%) | Discharge capacity retention rate after 300 cycles (%) |
|---|---|---|---|---|---|---|---|---|---|---|
| | EC (% by mass) | PC (% by mass) | EMC (% by mass) | GBL (% by mass) | Kind | (% by mass) | Kind | (% by mass) | | |
| Example 17 | 45 | 45 | 0 | 0 | VC | 1 | PSAH | 0.6 | 3.5 | 83.6 |
| Example 18 | 45.25 | 45.25 | 0 | 0 | VC | 1 | PSAH | 0.1 | 3.6 | 80.1 |
| Example 19 | 44.3 | 44.3 | 0 | 0 | VC | 1 | PSAH | 2 | 3.4 | 80.3 |
| Example 20 | 36 | 54 | 0 | 0 | VC | 1 | PSAH | 0.6 | 2.8 | 81.1 |
| Example 21 | 54 | 36 | 0 | 0 | VC | 1 | PSAH | 0.6 | 4.1 | 83.6 |
| Example 22 | 45 | 45 | 0 | 0 | VC | 1 | ESAH | 0.6 | 3.4 | 81.3 |
| Example 23 | 45 | 45 | 0 | 0 | VC | 1 | SPAH | 0.6 | 3.4 | 82.3 |
| Example 24 | 45 | 45 | 0 | 0 | VC | 1 | SBuAH | 0.6 | 3.5 | 82.6 |
| Example 25 | 45 | 45 | 0 | 0 | VC | 1 | BSAH | 0.6 | 3.5 | 80.8 |
| Example 26 | 45 | 45 | 0 | 0 | VC | 1 | SBAH | 0.6 | 3.5 | 81.1 |
| Example 27 | 45 | 45 | 0 | 0 | VEC | 1 | PSAH | 0.6 | 3.6 | 83.3 |
| Example 28 | 45 | 45 | 0 | 0 | FEC | 1 | PSAH | 0.6 | 3.5 | 83.7 |
| Example 29 | 45 | 45 | 0 | 0 | DFEC | 1 | PSAH | 0.6 | 3.6 | 83.6 |
| Example 30 | 44 | 44 | 0 | 2 | VC | 1 | PSAH | 0.6 | 2.4 | 80.6 |
| Example 31 | 43 | 43 | 4 | 0 | VC | 1 | PSAH | 0.6 | 4.5 | 83.6 |
| Example 32 | 37 | 37 | 16 | 0 | VC | 1 | PSAH | 0.6 | 6.5 | 83.5 |
| Comparative Example 6 | 45.3 | 45.3 | 0 | 0 | VC | 1 | — | — | 3.7 | 79.9 |
| Comparative Example 7 | 45.5 | 45.5 | 0 | 0 | — | — | PSAH | 0.6 | 8.2 | 79.6 |
| Comparative Example 8 | 30 | 30 | 30 | 0 | VC | 1 | PSAH | 0.6 | 9.7 | 83.4 |
| Comparative Example 9 | 45 | 45 | 0 | 0 | VC | 1 | MSAH | 0.6 | 3.7 | 79.6 |
| Comparative Example 10 | 45 | 45 | 0 | 0 | VC | 1 | SCAH | 0.6 | 3.8 | 79.7 |

$LiPF_6$: 8.4% by mass
EC: Ethylene carbonate
PC: Propylene carbonate
EMC: Ethyl methyl carbonate
GBL: γ-Butyrolactone
VC: Vinylene carbonate
VEC: Vinyl ethylene carbonate
FEC: Fluoroethylene carbonate
DFEC: Difluoroethylene carbonate
PSAH: 1,3-Propanedisulfonic anhydride
ESAH: 1,2-Ethanedisulfonic anhydride
SPAH: 2-Sulfopropionic anhydride
SBuAH: 3-Sulfobutyric anhydride
BSAH: Benzenedisulfonic anhydride
SBAH: Sulfobenzoic anhydride
MSAH: Methanesulfonic anhydride
SCAH: Succinic anhydride As shown in Table 2, it has been noted from the results of Examples 17 to 21 and Comparative Example 6 that by mixing the cyclic sulfone compound, the blister of the battery thickness at the time of storing the battery at 90° C. for 4 hours was the same degree or reduced as compared with Comparative Example 6 in which the cyclic sulfone compound was not added; and that the discharge capacity retention rate at the time of repeating the constant-current discharge by 300 cycles was enhanced as compared with Comparative Example 6 in which the cyclic sulfone compound was not added.

It has been noted from the results of Examples 22 to 26 and Comparative Examples 9 and 10 that by adding the cyclic sulfone compound, not only the blister of the battery thickness at the time of storing the battery at 90° C. for 4 hours was reduced, but the discharge capacity retention rate at the time of repeating the constant-current discharge by 300 cycles was enhanced as compared with Comparative Example 9 in which the chain sulfone compound was added and Comparative Example 10 in which the cyclic carboxylic acid anhydride was added.

It has been noted from the results of Example 17 and Examples 27 to 29 and Comparative Example 7 that by adding the cyclic carbonate having a carbon-carbon multiple bond or the halogenated cyclic carbonate together with the cyclic sulfone compound, the blister of the battery thickness at the time of storing the battery at 90° C. for 4 hours was reduced as compared with Comparative Example 7 in which these compounds were not added; and that the discharge capacity retention rate at the time of repeating the constant-current discharge by 300 cycles was enhanced as compared with Comparative Example 7.

It has been noted from the results of Example 30 that by adding γ-butyrolactone, the blister of the battery thickness as the time of storing the battery at 90° C. for 4 hours was more reduced.

It has been noted from the results of Examples 31 and 32 and Comparative Example 8 that by incorporating 80% by mass or more of the cyclic carbonate which does not have a carbon-carbon multiple bond and which does not contain a halogen in the nonaqueous solvent, not only the blister of the battery thickness at the time of storing the battery at 90° C. for 4 hours was reduced, but the discharge capacity retention rate at the time of repeating the constant-current discharge by 300 cycles was enhanced as compared with Comparative Example 8.

According to the embodiments, it is possible to provide a nonaqueous electrolytic solution secondary battery which, even when a cyclic carbonate is incorporated in a high concentration in a nonaqueous electrolytic solution, is able to enhance a discharge capacity retention rate at the time of repetition of charge and discharge.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A nonaqueous electrolytic solution secondary battery comprising:
a positive electrode;
a negative electrode; and
a nonaqueous electrolytic solution having an electrolyte salt dissolved in a nonaqueous solvent, wherein
the nonaqueous solvent contains 80% by mass or more of a cyclic carbonate which does not have a carbon-carbon multiple bond and which does not contain a halogen, and contains a cyclic sulfone compound having any one of structures represented by the following formulae (1) to (4)

wherein each of R1 and R2 represents $C_mH_{2m}$ where $1 \leq m \leq 4$ and each of R3 to R10 independently represents $C_nH_{2n+1}$ where $1 \leq n \leq 4$, and
wherein the cyclic carbonate which does not have a carbon-carbon multiple bond and which does not contain a halogen is at least one member selected from the group consisting of: ethylene carbonate, propylene carbonate, butylene carbonate and trimethylene carbonate.

2. The nonaqueous electrolytic solution secondary battery according to claim 1, wherein
the cyclic carbonate which does not have a carbon-carbon multiple bond and which does not contain a halogen is at least one member selected from the group consisting of ethylene carbonate and propylene carbonate.

3. The nonaqueous electrolytic solution secondary battery according to claim 1, wherein
a content of the cyclic sulfone compound in the nonaqueous solvent is 0.1% by mass or more and not more than 2.0% by mass.

4. The nonaqueous electrolytic solution secondary battery according to claim 1, wherein
the nonaqueous solvent further contains a cyclic carbonate having a carbon-carbon multiple bond.

5. The nonaqueous electrolytic solution secondary battery according to claim 1, wherein
the nonaqueous solvent further contains a halogenated cyclic carbonate.

6. The nonaqueous electrolytic solution secondary battery according to claim 1, wherein
the nonaqueous solvent further contains a lactone.

7. The nonaqueous electrolytic solution secondary battery according to claim 1, comprising an exterior member for housing made of a laminated film.

8. The nonaqueous electrolytic solution secondary battery according to claim 1, wherein
the nonaqueous electrolytic solution is held by a polymer compound.

9. The nonaqueous electrolytic solution secondary battery according to claim 8, wherein
the polymer compound is polyvinylidene fluoride or a copolymer thereof.

10. The nonaqueous electrolytic solution secondary battery according to claim 8, wherein a content of the polymer compound ranges from 0.1% by mass to 10% by mass relative to a total mass of the electrolytic solution and the polymer compound.

11. The nonaqueous electrolytic solution secondary battery according to claim 8, wherein the negative electrode comprises a negative electrode active material layer, and a thickness of the negative electrode active material layer ranges from 40 μm to 100 μm.

12. The nonaqueous electrolytic solution secondary battery according to claim 1, wherein the sulfone compound has a structure represented by the following formulae (1) and (4)

wherein R1 represents $C_mH_{2m}$ where $1 \leq m \leq 4$ and each of R7 to R10 independently represents $C_nH_{2n+1}$ where $1 \leq n \leq 4$.

13. The nonaqueous electrolytic solution secondary battery according to claim 1, wherein the sulfone compound is 1,3-propanedisulfonic anhydride.

14. A nonaqueous electrolytic solution comprising:
an electrolyte salt dissolved in a nonaqueous solvent, wherein
the nonaqueous solvent contains 80% by mass or more of a cyclic carbonate which does not have a carbon-carbon multiple bond and which does not contain a halogen, and contains a cyclic sulfone compound having any one of structures represented by the following formulae (1) to (4)

(1)

(2)

(3)

-continued (4)

wherein each of R1 and R2 represents $C_mH_{2m}$ where $1 \leq m \leq 4$; and each of R3 to R10 independently represents $C_nH_{2n+1}$ where $1 \leq n \leq 4$ and wherein the cyclic carbonate which does not have a carbon-carbon multiple bond and which does not contain a halogen is at least one member selected from the group consisting of: ethylene carbonate, propylene carbonate, butylene carbonate and trimethylene carbonate.

15. The nonaqueous electrolytic solution according to claim 14, wherein
the cyclic carbonate which does not have a carbon-carbon multiple bond and which does not contain a halogen is at least one member selected from the group consisting of ethylene carbonate and propylene carbonate.

* * * * *